E. SEALY,

Assignor to P. A. Dailey.

FELT FABRICS.

No. 7,718. Reissued May 29, 1877.

Attest:

Edward Lewis

Fred Benjamin

E. Sealy

By his attorney

Charles E. Fisher

N. PETERS, PHOTO-LITHOGRAPHER, WASHINGTON, D. C.

UNITED STATES PATENT OFFICE.

EDWARD SEALY, OF NEWARK, NEW JERSEY, ASSIGNOR TO P. A. DAILEY, OF NEW YORK, N. Y.

IMPROVEMENT IN FELT FABRICS.

Specification forming part of Letters Patent No. 90,198, dated May 18, 1869; reissue No. 7,718, dated May 29, 1877; application filed April 27, 1877.

*To all whom it may concern:*

Be it known that I, EDWARD SEALY, of Newark, Essex county, New Jersey, have invented an Improvement in the Manufacture of Felted Fabrics, of which the following is a specification:

My invention relates to an improvement in the manufacture of felted fabrics, which I have applied in the production of felt hats; and my invention consists of a felt presenting a variegated surface or pattern, produced by inlaying a body of felt of one color with threads or yarns of one or more different colors, which yarns are combined with the body by a felting operation.

As the pattern-yarns are inlaid in the body they cannot be removed by the finishing operations to which the body is subjected after felting; consequently the pattern is permanent.

Figure 1:
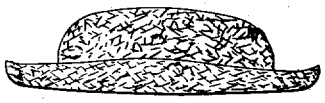
Figure 2:
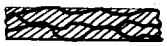

In the accompanying drawing, Figure 1 represents a hat made from the improved felt, and Fig. 2 a section of the felt.

The mode which I have devised is to wind the pattern-yarns into the bat as it is formed by winding a fleece from a carding-engine upon the former or block in the manufacture of hats. In order to carry out this process with economy, and to produce regularity in the design of the pattern, I have improved the forming-machine usually employed in forming wool-hat bodies by combining with it a spool-stand, which supports a number of spools or bobbins, holding the pattern-yarn.

In forming the hat-bodies the fleece of wool from the doffer of the machine and the pattern-yarns are both applied to the hat-former, so that as it revolves the pattern-yarns are wound upon the hat-former in the layers of the fleece, and are thus inlaid in the latter.

The vibrations of the former causes the pattern-yarns to cross each other in the bat, so as to produce a cross-barred or plaid pattern, which may be greatly varied by varying the number and color of the pattern-yarns, and the direction in which they are guided in passing to the former.

When the bats are formed they are hardened, sized, and finished in the usual manner, and when finished their surfaces present a pattern formed by the pattern-threads upon a groundwork of the color of the wool-fleece of which the body has been formed.

I do not limit the invention set forth in this patent to an inlaid bat produced by such process or machine as the process for inlaying the pattern-yarn may be varied, and different machinery may be used.

Thus, for example, instead of drawing each pattern-yarn from a separate spool or bobbin the yarns may be formed by weaving or otherwise into net-work, and the sheet of net-work may be wound into the layers of the fleece, or the bat may be formed in the usual way and the pattern thread or yarn may be inserted in the body after it is formed by means of a needle or otherwise.

I claim—

1. The process of incorporating with a body of loose fibers or fleece a series of yarns, and then securing the two together solely by felting, substantially as described, forming a fabric in which the felt-fibers and the yarns jointly produce an ornamental face, as specified.

2. The combination, in a felt fabric, of a body of felt and a series of yarns united in a net, inserted in and incorporated with the body solely by felting, and with the body constituting the ornamental face of the fabric, substantially as set set forth.

3. As a new article of manufacture a felt fabric consisting of a body of felt and a series of pattern-yarns incorporated in and with the body, and forming therewith an ornamental face, as set forth.

In testimony whereof I have signed my name to this specification in the presence of two subscribing witnesses.

EDWARD SEALY.

Witnesses:
GEO. B. WATERMAN,
CHAS. WATERMAN.